Dec. 31, 1940.  S. H. BENJAMIN  2,226,964
BLADE RETAINING SAFETY RAZOR
Filed Sept. 13, 1940  8 Sheets-Sheet 5
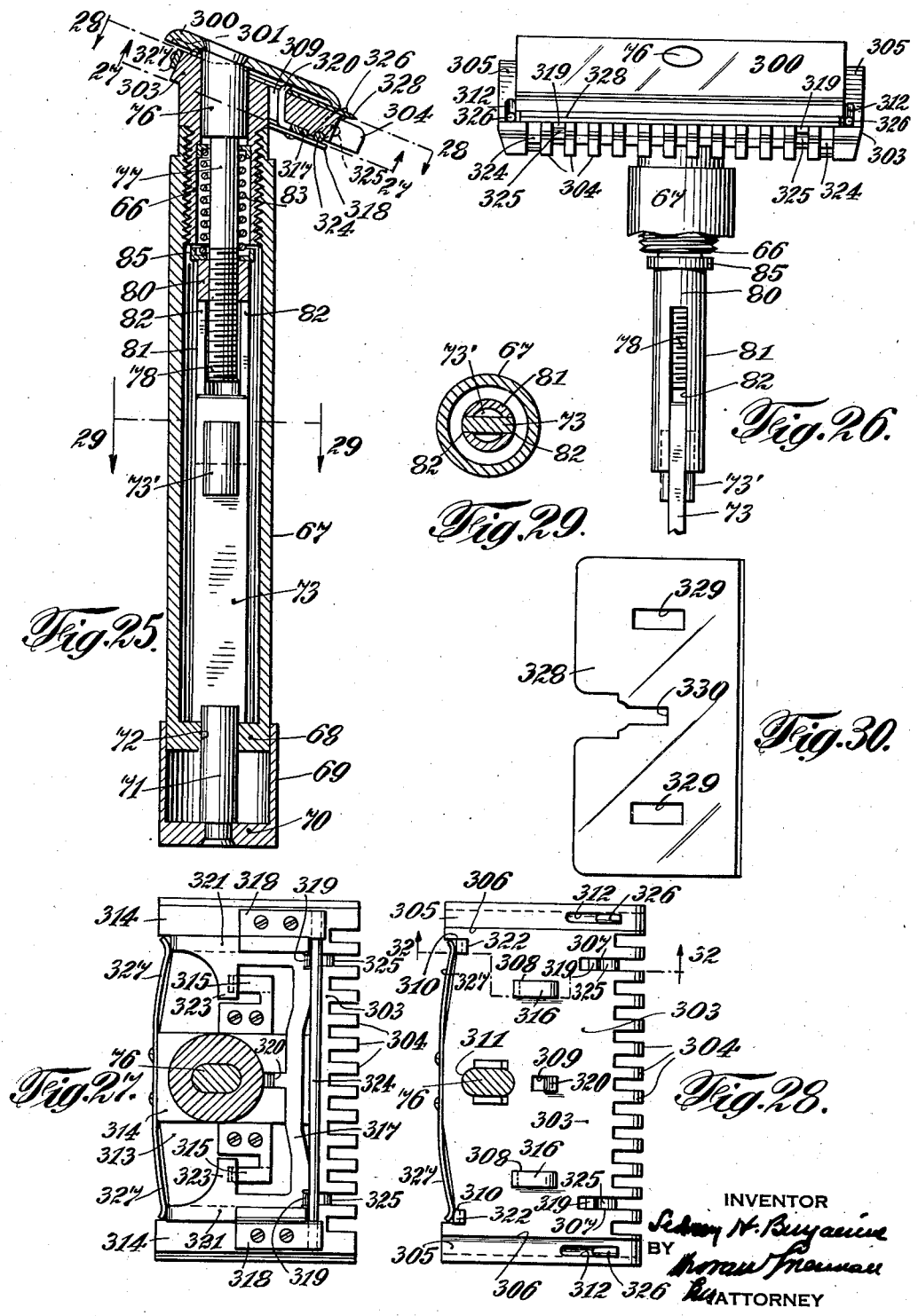
INVENTOR
Sidney H. Benjamin
BY
ATTORNEY

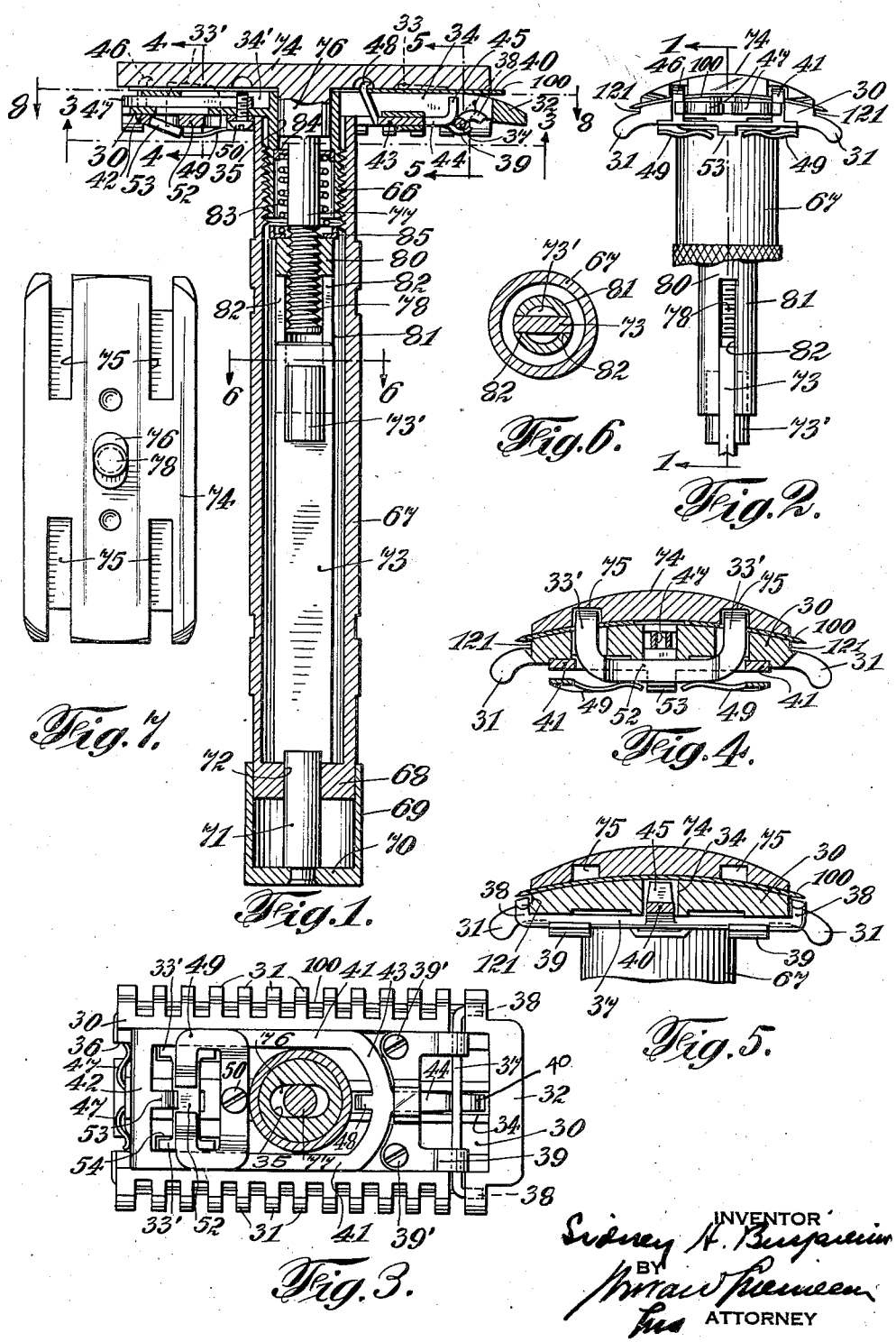

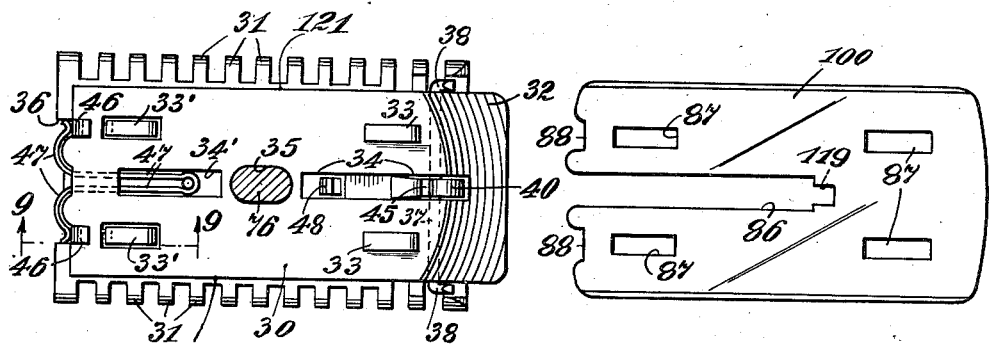
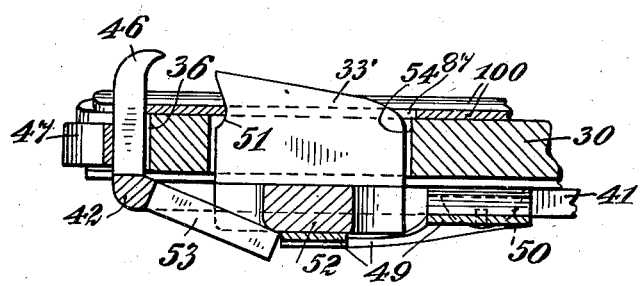
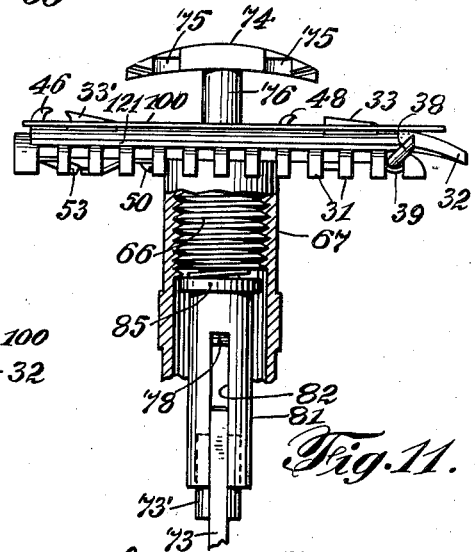

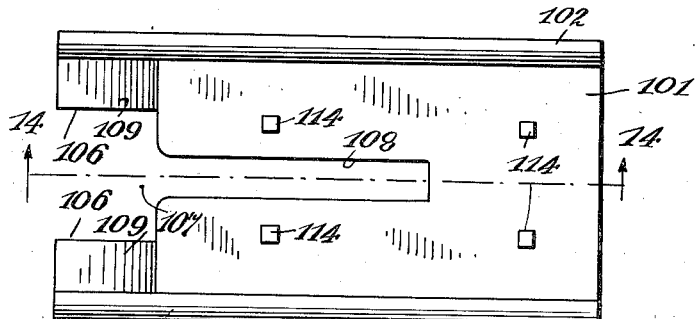
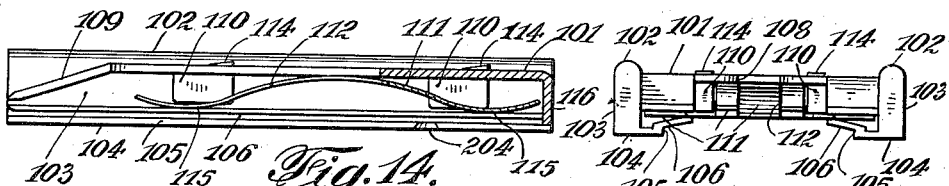
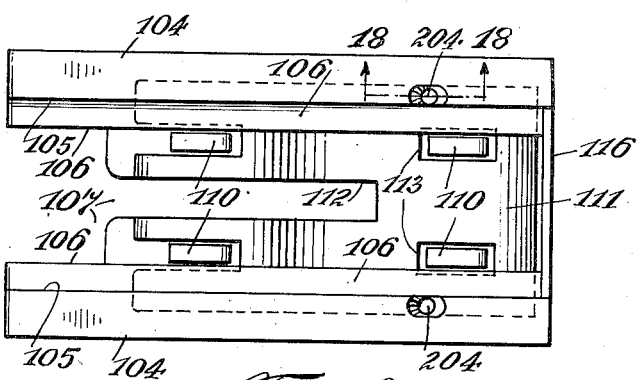
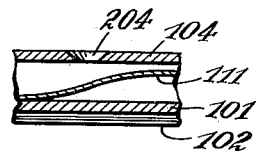
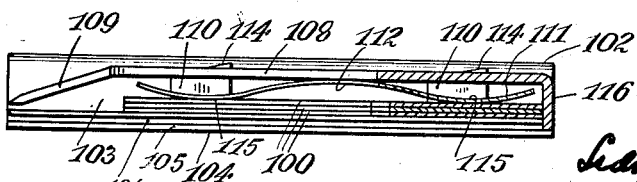

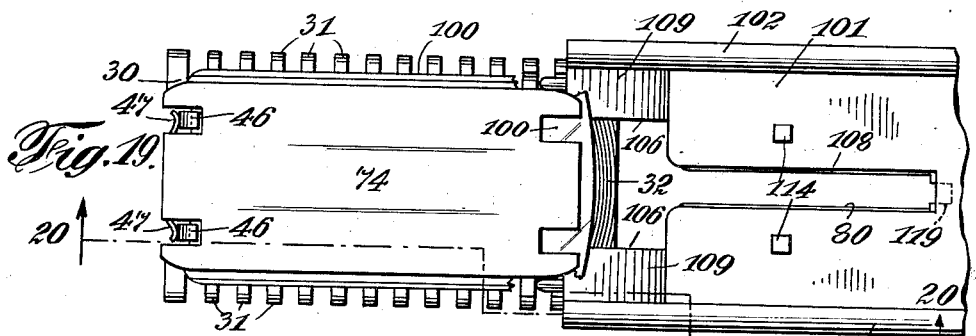
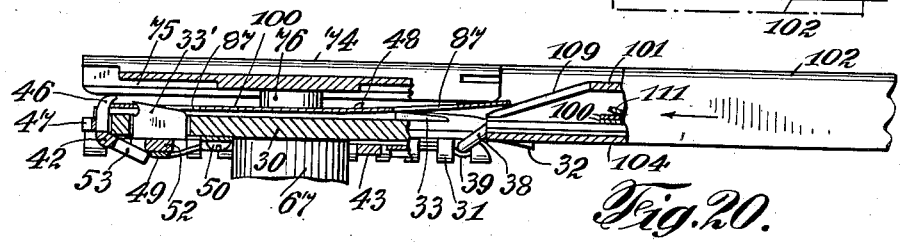
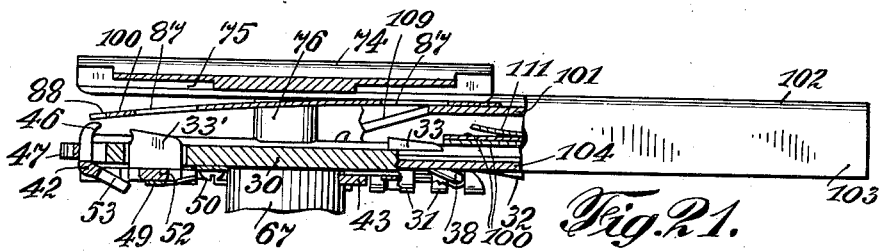
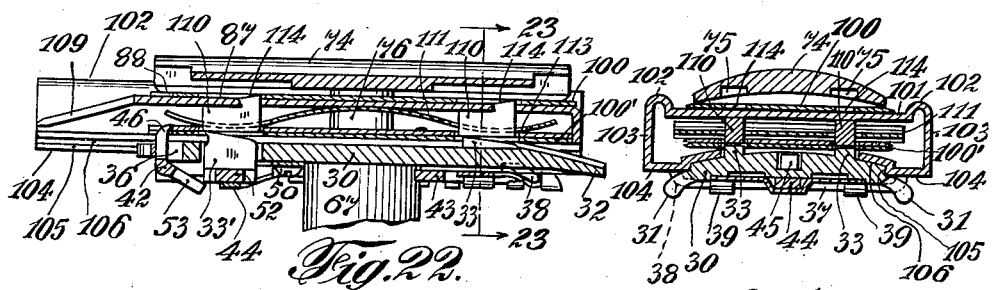
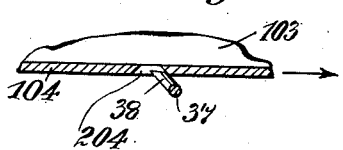

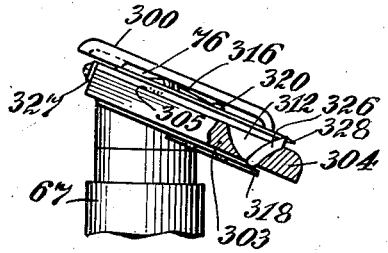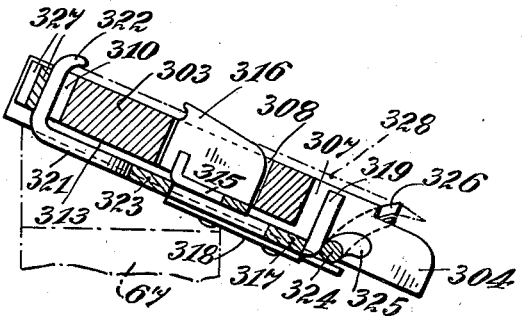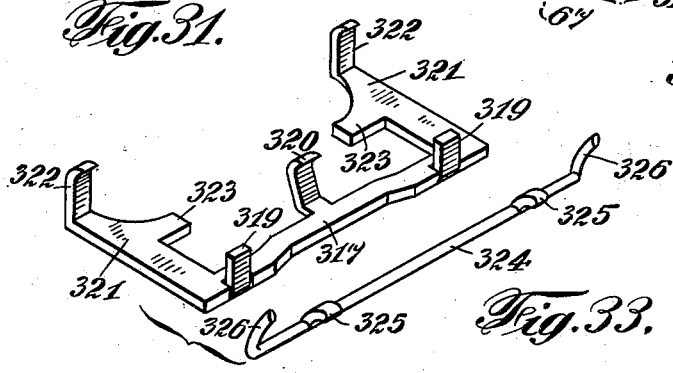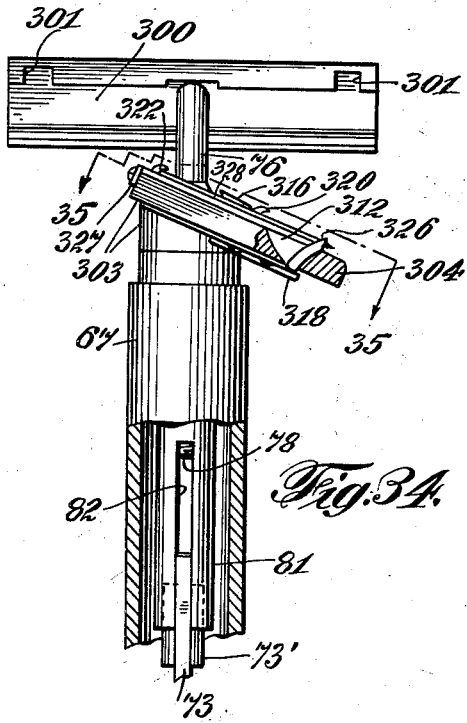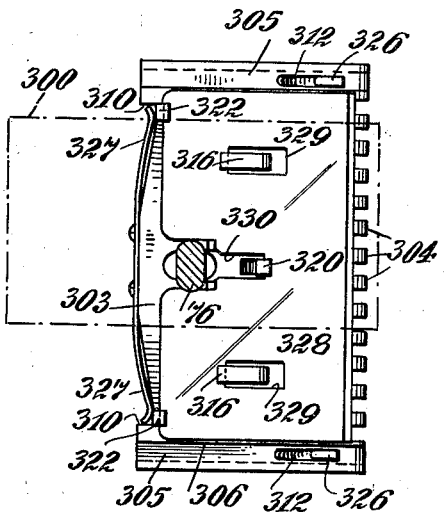

Dec. 31, 1940.   S. H. BENJAMIN   2,226,964
BLADE RETAINING SAFETY RAZOR
Filed Sept. 13, 1940   8 Sheets-Sheet 7
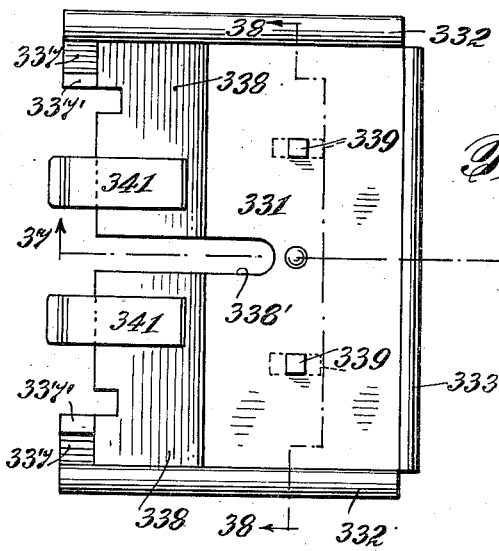
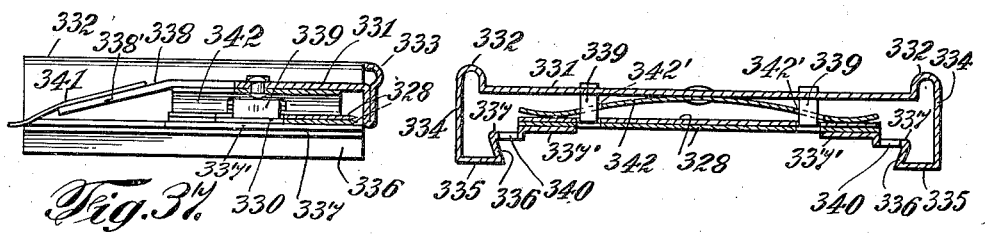
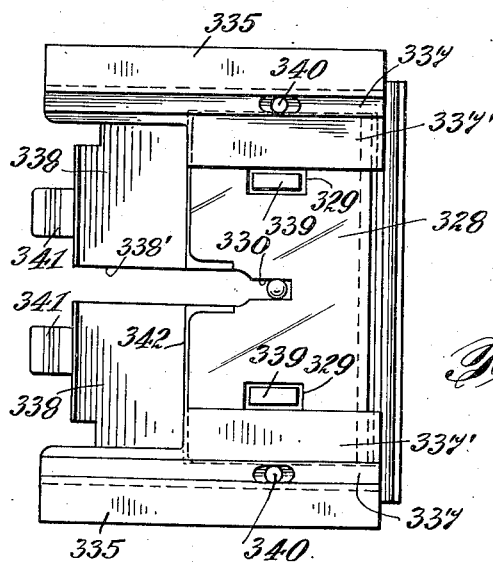
INVENTOR
Sidney H. Benjamin
BY
ATTORNEY Dec. 31, 1940. S. H. BENJAMIN 2,226,964
BLADE RETAINING SAFETY RAZOR
Filed Sept. 13, 1940 8 Sheets-Sheet 8
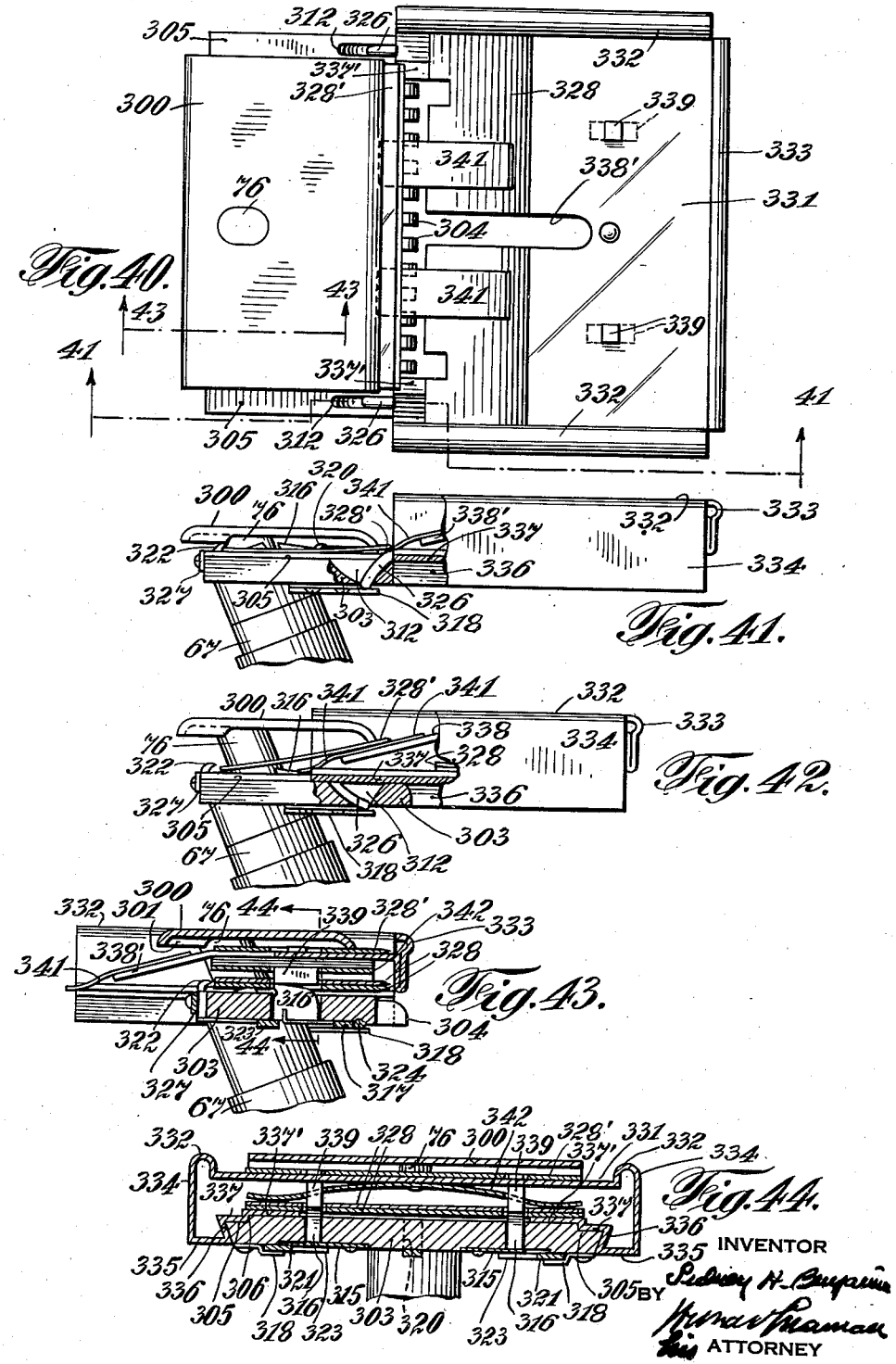

Patented Dec. 31, 1940

2,226,964

UNITED STATES PATENT OFFICE 2,226,964

BLADE RETAINING SAFETY RAZOR

Sidney H. Benjamin, Milwaukee, Wis.

Application September 13, 1940, Serial No. 356,570

11 Claims. (Cl. 30—40)

My invention relates to improvements in safety razors and refers particularly to safety razors of such construction as to prevent the removal or insertion of a blade without the assistance of special devices adapted for those purposes.

One of the objects of my invention is a safety razor of such construction that a blade can not be inserted therein without the assistance of a blade-carrying device adapted for that purpose.

Another object of my invention is a safety razor of such construction that a blade can not be removed therefrom without the assistance of a blade-carrying device adapted for that purpose.

Another object of my invention is a safety razor of such construction that the insertion of a blade-carrying device therein will insert and properly deposit a blade therein, and that the withdrawal of said blade-carrying device will withdraw a previously deposited blade therefrom.

Another object of my invention is a safety razor of such construction that a blade inserted therein will be firmly but removably attached to the guard member without abutment of the top, or cap, member.

Another object of my invention is a safety razor of such construction that a blade deposited and properly positioned on the guard member can not be conveniently removed therefrom without the assistance of a blade-carrying member adapted for that purpose.

Another object of my invention is a safety razor of such construction that a blade may be readily and properly inserted and deposited upon a guard member without contact with the fingers of the operator.

Another object of my invention is a safety razor of such construction that a blade deposited upon a guard member can be removed without contact with the fingers of the operator.

It is evident that the safety razors of my invention possessing the above-mentioned attributes, and many others which will be evident upon a consideration of my disclosures and descriptions herein, have many important and valuable properties over those in which it is necessary for the operator to handle the blades, frequently resulting in cutting the fingers; and, in which the blade frequently becomes displaced due to the tilting, or canting, of the device during the blade-positioning operation.

In the accompanying drawings illustrating modifications of the devices of my invention, similar parts are designated by similar numerals.

Figure 1 is a central vertical section taken on the line 1—1 of the razor of Figure 2.

Figure 2 is a left-end view of the device of Figure 1.

Figure 3 is a section through the line 3—3 of Figure 1.

Figure 4 is a section through the line 4—4 of Figure 1.

Figure 5 is a section through the line 5—5 of Figure 1.

Figure 6 is a section through the line 6—6 of Figure 1.

Figure 7 is a bottom view of the cap of the device of Figure 1.

Figure 8 is a section through the line 8—8 of Figure 1, with the cap, or top, removed.

Figure 9 is an enlarged section through the line 9—9 of Figure 8.

Figure 10 is a top view of a razor blade adapted for use in my razor.

Figure 11 is a side view of the razor of Figure 1, partly in section and with the cap or top raised and revolved 90°.

Figure 12 is a top view of Figure 11.

Figure 13 is a top view of a blade magazine ejector adapted for use with my razor shown in the previous figures.

Figure 14 is a section through the line 14—14 of Figure 12.

Figure 15 is an end view of Figure 13.

Figure 16 is a bottom view of Figure 13 with the blades removed.

Figure 17 is a section through the line 14—14 of Figure 13, with a stack of blades inserted.

Figure 18 is an enlarged section through the line 18—18 of Figure 16.

Figure 19 is a top view of the blade magazine ejector of Figures 12 to 18, partially introduced into the razor of Figure 1 for the purpose of removing a used blade and the insertion of a new one.

Figure 20 is a section through the line 20—20 of Figure 19.

Figure 21 is a vertical cross-section of the ejector and the razor head, with the ejector further advanced into the razor over that shown in Figure 20.

Figure 22 is a vertical cross-section with the ejector fully advanced into the razor head.

Figure 23 is a section through the line 23—23 of Figure 22.

Figure 24 is a perspective showing the relationship of trip 37 and rod 38.

Figure 25 is a longitudinal section of a modified form of a device of my invention.

Figure 26 is a front view of a portion of the device of Figure 25, partly in section.

Figure 27 is a section through the line 27—27 of Figure 25.

Figure 28 is a section through the line 28—28 of Figure 25.

Figure 29 is a section through the line 29—29 of Figure 25.

Figure 30 is a plan view of a razor blade adapted for use with the device of Figure 25.

Figure 31 is an end view of Figure 25, partly in section.

Figure 32 is a section through the line 32—32 of Figure 28.

Figure 33 is a perspective view of the slidable member and the actuating member.

Figure 34 is a side view of the device with the cap raised and revolved 90°.

Figure 35 is a section through the line 35—35 of Figure 34.

Figure 36 is a top plan view of an ejector adapted for use with the device of Figure 25.

Figure 37 is a section through the line 37—37 of Figure 36.

Figure 38 is a section through the line 38—38 of Figure 36.

Figure 39 is a bottom view of the device of Figure 36.

Figure 40 is a top plan view of the ejector of Figure 36, partly inserted in the razor of Figure 25.

Figure 41 is a section through the line 41—41 of Figure 40.

Figure 42 is the device of Figure 40 with the ejector further advanced with the razor of Figure 25.

Figure 43 is a section through the line 43—43 of Figure 40.

Figure 44 is a section through the line 44—44 of Figure 43.

The particular form of a device of my invention as shown in Figures 1 to 12 comprises a guard member 30 having a plurality of extended teeth 31, 31 upon each side thereof, the end portion 32 of the guard 30 being inclined downwardly as shown particularly in Figure 1, for purposes to be described later.

The upper face of the guard 30 carries a plurality of spaced extended lugs 33, 33 and 33', 33', the lugs 33', 33' being undercut to retain a blade in a locked position, two longitudinal recesses, or slots, 34, 34' and a centrally positioned elongated opening 35. One end of the guard 30 has a recess 36, all of which are shown particularly in Figure 8.

A blade retaining mechanism is carried by the under face of the guard 30 and comprises a trip bar 37 the extremities of which are bent upwardly and extend between the teeth 31, 31 on opposite sides of the guard forming the trips 38, 38, said trips being preferably inclined toward the end of the guard 30 near the downwardly extended member 32. The trip bar 37 being revolubly carried by the bearings 39, 39 attached to the under face of the guard 30, by screws 39', 39'. The central portion of the trip bar 37 carries a curved member 40, adapted to have a cam movement upon a revoluble movement of the trip bar 37.

A slidable member adapted to retain a blade upon, and release it from, the guard comprises the sides 41, 41, the end 42, and the end 43, the latter being extended into the arm 44 having the upturned end 45 extending into the slot 34. This slidable member carries two hooked blade retaining members 46, 46 extending above the upper face of the guard 30 and slidable within recesses within the recess 36. These two members 46, 46 are normally retained in pressed abutment upon the end of the guard by the flat springs 47, 47. This slidable member carries also the hooked blade retaining member 48 extending through the slot 34 and above the upper face of the guard 30. This slidable member is slidably attached to the under face of the guard 30 by the bearing having the arms 39, 39 and the bearing 49 attached to the guard 30 by the screw 50.

Each of the two upwardly extended lugs 33', 33' has an undercut 51 and the two lugs are carried by a member 52 which abuts upon the resilient member 49, and is normally locked by the end of the arm 53 of the slidable movable member, the lugs being movable through openings 54, 54 of the guard 30, as shown particularly in Figure 9.

The illustrated handle comprises a cylindrical member 67, the upper portion of which is internally threaded to mesh with the exteriorly threaded guard member 66, the lower end of the cylindrical member 67 being closed by the closure member 68. The lower portion of the cylindrical member 67 carries a revoluble sleeve 69, the closed end 70 of the sleeve 69 carrying the fixedly attached cylindrical member 71 which extends through the opening 72 of the end member 68 of the cylindrical member 67 and carries a fixedly attached elongated flat member 73, which is guided at its upper portion by a cylindrical member 73' within the sleeve 80.

My device includes a cap adapted to be capable of pressure abutment upon the upper face of a blade and to maintain it in fixed position between the guard and the cap for shaving purposes.

The cap illustrated in the drawings under consideration comprises a top member 74 having the two parallel longitudinal recesses 75, 75, which are so positioned as to receive the lugs 33, 33 and 33', 33' of the guard 30. Fixedly attached to the under face of the top member 74 is a centrally positioned downwardly extended member, the upper portion 76 of which is longitudinally shaped, its dimensions being such that it can be passed through the opening 35 of the guard 30 when the longitudinal axes of the members 76 and 35 are parallel, and which portion 76 is not capable of being passed through said opening when said longitudinal axes are not parallel to each other. The longitudinally shaped member 76 is extended into an elongated member 77 adapted to pass through the opening 35 of the guard 30 and into the cylindrical stud 66, the lower portion 78 of said member 77 being threaded. Co-acting with the threaded member 78 is the interiorly threaded revoluble cylindrical member 80, the lower end portion 81 of which has the opposed longitudinal slits, or recesses, 82, 82 into which the longitudinal flat member 73 is inserted. A coil spring 83 abutting upon the member 84 and the loose washer 85 which abuts upon the upper face of the cylindrical member 80, tends to push the top member 74 upon a blade placed upon the guard.

The revolution of the sleeve 69, revolves the member 73 which in turn revolves the sleeve 80. If the revolution of the sleeve 69 is clock-wise, this revolution moves the sleeve 80 upwardly until the washer 85 abuts upon the lower face of the stud 66, a further movement drawing the cap 74 firmly upon a blade situated upon the guard 30 and maintaining it in position during a shaving operation.

If it is desired to insert a new blade or remove an old blade, or both, the sleeve 69 is revolved counter-clock-wise, whereupon the sleeve 80 moves downwardly, the washer 85 is separated from the lower face of the stud 66, and the spring 83 will release its pressure of the top 74 from contact with the blade, and if this movement is continued as far as it will go, the sleeve 69 can be pushed up bringing the portion 76 of the vertically movable member above the opening 35 of the guard, the top 74 can be revolved, and if revolved a quarter turn the spring 83 and member 76 will retain it in this open portion, which position is adapted for the ready washing of the device as seen in Figures 11 and 12.

The form of blade adaptable for the described razor of my invention is shown in Figure 10 and comprises a blade of ordinary, or desired, thickness and dimensions having a longitudinal centrally positioned recess 86, four longitudinal openings 87, 87, and end recesses 88, 88 for purposes to be described later.

One of the objects of my invention is a razor so constructed that it is impossible to insert or remove a free individual blade without the assistance of specially constructed devices particularly adapted for that purpose.

That a blade can not be introduced into or removed from the described device of my invention without the employment of specially designed devices is evident from a consideration of the following description.

Assuming that the device is in the normal condition for shaving as shown in Figures 1 and 2, or in a condition with the cap 74 raised from the guard 30, the blade 100 is positioned upon the guard 30 with the blade retaining member 48 extending through the slot 34 of the guard 30 and the recess 119 of the blade, the hooked end being positioned upon the blade preventing its movement longitudinally in one direction as the member 48, as well as the hook members 46—46, is prevented from movement as long as the described slidable member 41 is rendered immovable. The end portion of the blade is positioned between the blade retaining hook members 46, 46 and the lugs 33', 33' inserted in openings 87, 87 of the blade. The lugs 33', 33' are retained from downward movement by the abutment of the member 53 upon the lower portion of the bar 52 of the lugs 33', 33'. Further, the blade 100 is positioned below the hook members 46, 46, which are also a part of the slidable member 41 and also below the undercut lugs 33', 33' which are carried by the guard, and hence it is evident that the blade 100 is retained from longitudinal movement in both directions and, further, is retained from vertical movement from the guard, as best seen in Figure 12.

The illustrated handle comprises a cylindrical member 67, the upper portion of which is internally threaded to mesh with the exteriorly threaded guard member 66, the lower end of the cylindrical member 67 being closed by the closure member 68. The lower portion of the cylindrical member 67 carries a revoluble sleeve 69, the closed end 70 of the sleeve 69 carrying the fixedly attached cylindrical member 71 which extends through the opening 72 of the end member 68 of the cylindrical member 67 and carries a fixedly attached elongated flat member 73, which is guided at its upper portion by a cylindrical member 73' within the sleeve 80.

It is to be noted that even the raising of the cap by revolution of the sleeve 69 will not release the blade, as the blade is firmly attached to the guard by the described mechanism carried by the guard.

That a blade can not be introduced into the described device of my invention without special mechanism adapted for that purpose is evident from the following:

As a blade can not be introduced unless the cap is raised from abutment upon the guard, it is necessary to raise the cap from the guard and maintain it in that position during the insertion of a blade. Assuming, therefore, that the cap is raised from the guard and retained in that position during the attempt to introduce a blade. In order that a blade may be placed in abutment upon the upper face of the guard, the one edge of the blade must be beneath the hook-like members 46, 46, beneath the hook-like members 33', 33', beneath the hook-like member 48, and the projecting lugs 33, 33 of the guard must be inserted in the openings 87, 87 of the blade. A consideration of the drawings shows that such positioning is not possible. If a blade be moved inwardly in order that the member 76 of the cap can pass through the opening 86 of the blade, the interior edge of that slot will contact the blade-retaining member 48 of the guard, preventing the further insertion of the blade and there is not space enough between the hook-like blade-retaining member 48 and its adjacent lugs 33 of the guard to flex the blade beneath the member 48. Further, the edge of the blade must be positioned beneath the hook-like members 46, 46, and the blade can not reach them, and even if it did pass the cap member 76, there is not space enough between the members 46, 46 and their adjacent guard lugs 33', 33' to flex the blade to accomplish the purpose. As it is evident that the guard lugs 33, 33 must be inserted within the blade openings 87, 87 in order to position the blade, this can not be accomplished for the reasons stated above. In addition to the above-mentioned means for preventing the insertion of a blade without the employment of a special device, if the cap is positioned as shown in Figures 11 and 12, the width of the member 76 will prevent the insertion of a blade as it is wider than that of the blade slot 86. It is evident, therefore, that the employment of some device which will depress the trips 38, 38 is necessary in order to insert a blade.

In order to demonstrate that my device is operative, I illustrate and describe one form of a device adapted for this purpose.

Figures 13 to 18 illustrate one form of a device of my invention adapted for the insertion, and removal of blades into and from the razor of my invention previously described.

The particular form of my operating device shown in Figures 13 to 18 comprises a blade magazine adapted to receive a stacked plurality of blades. The top, sides and a portion of the bottom are formed by a flat top member 101, the sides of which are bent upwardly and then outwardly to form the curved edges 102, 102, then downwardly to form the sides 103, 103, then inwardly to form the bottom members 104, 104, then upwardly to form the shoulders 105, 105 and then inwardly to form the inclined blade guides 106, 106. The top 101 has a longitudinal recess 108, the portion 109 of the top 101, containing the rectangular recess 107 being inclined downwardly, the outer edge of which is spaced from the inclined member 106 to allow of the passage of a blade therethrough. The lugs 110, 110 which are rectangular in shape are secured to the top 101 of the operating device. Positioned within the device is a leaf spring 111 having the longitudinal recess 112 and the openings 113, 113 through the latter of which extend the lugs 110, 110. The spring 111 is riveted to the top 101 by means of the rivet 114, and in normal position the two end extremities 115, 115 are resiliently pressed against the under face of the inclined member 106. A plurality of blades 100, 100 as shown in Figure 17, are stacked within the blade magazine, as shown, the recess 86 of the blades coinciding with the recess 108 of the top member 101 and the recess 112 of the spring 111, with the lugs 110, 110 of the device passing through the holes 87, 87 of the blade. The blades are thus positioned in exact coincidence with each other within the magazine. The space between the faces of the lugs 110, 110 and the inner edge of the member 106 is less than the thickness of two blades, thus allowing of the passage of only one blade from the magazine, and the spring 111 forces the bottom blade of the stack in the magazine against the under edge of the member 106 in position for withdrawal therefrom through the space between the members 106 and 109. The rear end of the magazine is closed by the member 116. The two bottom members 104, 104 have two openings 204, 204 for purposes described later.

The method of applying the blade magazine shown in Figures 13 to 18 to the insertion and deposit of a new blade and the withdrawal of an old blade to the razor shown in Figures 1 to 12, is shown in Figures 19 to 24.

Figures 19 and 20 illustrate the first step of thus inserting a blade and withdrawing a blade and comprises raising the cap 74 from abutment upon the positioned blade 100 which it is desirous of removing from the razor. The inclined portion 109 of the magazine top 101 is inserted between the inclined member 32 of the guard 30 and the blade 100, the blade 100 thus resting upon the upper face of the inclined portion 109 of the magazine top 101 and the magazine is forced slowly inwardly. During this movement the shoulders 105, 105 of the magazine abut upon the shoulders 121, 121 of the guard 30, thus guiding the magazine longitudinally over the guard.

This position is shown in Figure 20, from which it will be noted that the blade 100 is flexed and the end portion is upon the inclined members 109, 109 of the magazine, this flexing removing the blade from the blade-retaining member 48, that member, however, not being allowed to swing freely as the strips 38, 38 have not been moved.

Figure 21 illustrates a further inward movement of the magazine, in which the blade 100 has moved up further along the upper face of the inclined portions 109, 109 of the magazine. The trips 38, 38 have now been depressed by the bottom 104 of the magazine as it has passed over it, thus releasing the blade retaining member 48 and allowing it to be moved out of the way for the passage of the magazine blades.

Figure 22 shows the complete passage of the magazine into the razor. The blade 100 is now positioned upon the upper face of the top 101, and the square lugs 114, 114 engage the recess 119 of blade 100, and the withdrawal of the operating device carries the blade with it. The trip 53 has now been depressed by the magazine causing the blade-retaining member to move outwardly so that it will not interfere with the insertion of a new blade. During this movement the magazine has carried the stack of blades inwardly and has positioned them properly above the guard. The lower blade of this stack has been pressed downwardly by the spring 111 allowing it to pass over the magazine lugs 110, 110 and hence outwardly of the magazine, while the remaining blades are prevented from such movement. The lugs 33, 33 of the guard now enter the openings 87, 87 of the lower blade, thus retaining the blade positioned upon the guard during the withdrawal of the magazine. During this withdrawal, the released trips 38, 38 and 46, 46 move upwardly thus locking the blade-retaining members 46, 46 and 48 in their blade retaining position, and at the same time the magazine withdraws the old blade which is retained upon its top during this withdrawal movement. The cap 74 is then positioned in abutment upon the blade by revolving the handle sleeve 69.

It is to be noted that in my device a blade is placed in removable attached position upon a guard without the employment of a cap to accomplish this result.

Figure 21 illustrates a further movement of the magazine, in which the blade 100 has moved up further along the face of the inclined members 109, 109 of the magazine and is now resting partially upon the member 101 of the magazine. The bottom members 104, 104 have now passed over the trips 38, 38 causing them to revolve into a depressed position as shown in this figure. This movement of the trips 38, 38 has moved the slidable member, thus causing a movement of the blade-retaining members 48, 46, 46, and releasing the blade 100 from the guard.

Figures 22, 23 and 24 show the complete insertion of the magazine with the razor. The blade 100 is now positioned upon the upper face of the magazine top 101 and the lugs 114, 114 engage the recesses 87, 87 of the blade 100 and the withdrawal of the magazine carries the blade 100 with it. During this movement the magazine has carried the stack of blades inwardly and has positioned them properly above the guard, and as the openings 204, 204 of the magazine members 104, 104 are now above the trips 38, 38, the trips are pressed upwardly through the openings 204, 204 by means of the springs and hence return to their original position, thus moving the slidable member and bringing the blade-retaining members 48, 46, 46 into the original blade-retaining position, with the blade 100' beneath the hooked ends of these members and below the undercut lugs 33', 33', of the guard which have entered two openings 87, 87 of the blade 100', the guard lugs 33, 33 having entered the other two openings 87, 87 of the blade 100'. During the withdrawal of the magazine, blade 100' remains upon the guard and when the magazine is fully withdrawn the blade-retaining members retain the blade upon the guard in such manner that the blade cannot be removed except by means of a specially constructed device as is shown in the magazine thus described. During this withdrawal movement the old blade 100 is withdrawn by and upon the upper face of the magazine top 101.

The modified form of my device illustrated in Figures 25 to 44 is adapted for use with single edged blades, and its operating mechanism of the handle and cap is identical with that described in connection with the form of my device shown in Figure 1 and its accompanying drawings, it is believed that it is not necessary to describe it again, and, therefore, the same numerals are employed in the description of this form of my device as are employed in the first described form.

For purposes of clarity, the modified elements of this form of my device carry numerals commencing with the number 300.

This form of my device comprises a cap 300 having the recesses 301, 301 in the under face thereof, this cap being riveted, or otherwise fixedly attached to the member 76 of the handle mechanism, which allows the cap to be raised from contact with the guard, or a blade positioned upon the guard, as shown in Figure 34.

The guard 303 has a plurality of teeth 304, 304 extending from one side thereof, the side portions 305, 305 of the guard being lower than the face of the central portion, thus forming the shoulders 306, 306. The guard 303 has two forwardly positioned aligned elongated openings 307, 307, two centrally positioned aligned elongated openings 308, 308, a centrally positioned elongated opening 309, and two corresponding recesses 310, 310 in its rear portion. The guard has aslo an opening 311, of such size and shape as to allow vertical movements of the member 76, when the edge of the cap is parallel to the edge of the guard, but will prevent such movements when the edge of the cap is in angular position to the edge of the guard.

The depressed portions 305, 305 of the guard have the elongated openings 312, 312.

The central portion 313 of the underside of the guard between the two end flanges 314, 314 is depressed in order to allow the insertion of slidable operating elements therein, the face of said slidable elements being substantially flush with the face of the flanges 314, 314.

Fixedly attached to the under face of the guard are two flat springs 315, 315, each carrying a blade-retaining member 316 extending through an opening 308.

The slidable operating member, as shown particularly in Figure 33 comprises the base member 317, fixedly attached to the under face of the guard by means of the plates 318, 318 which act also as bearings for a trip member to be described later. This slidable member has two upwardly extended studs 319, 319, a centrally positioned extended hook-shaped blade-retaining member 320 and two arms 321, 321 each having an extended hook-shaped blade-retaining member 322 and an inwardly extended arm 323.

A tripping mechanism comprises the bar, or rod, 324, revoluble within the bearings 318, 318, the rod 324 carrying the two cam members 325, 325 and the ends 326, 326 of the rod 324 being bent upwardly.

Two flat springs 327, 327 are carried by the guard and abut upon the slidable member, thus tending to move the slidable member forwardly toward the front of the device, any rearward movement of the slidable member being against the tension of this spring.

When the device is in its normal position, as shown particularly in Figures 25, 27 and 28, the blade-retaining members 322, 322 extend through the recesses 310, 310 of the guard, the blade-retaining member 320 extends through the opening 309 of the guard, the cams 325, 325 of the tripping rod 324 abut upon the lugs 319, 319 of the slidable member, and the arms 323, 323 of the slidable member cover the springs 315, 315 thus preventing the downward movement of the blade-retaining members 316, 316.

When the device is in this position, all of the blade-retaining members 322, 322, 320, 316, 316 are extended above the upper face of the guard and can be released or depressed only by a movement of the tripping device.

If now the two trips 326, 326, which extend through the openings 312, 312 of the guard, be moved rearwardly, the rod 324 will revolve, the cams 325, 325 abutting upon the studs 319, 319 will move the slidable member rearwardly, thus moving the blade-retaining members 322, 322 and 320 rearwardly, and allow the depression of the blade-retaining members 316, 316.

In Figure 30 I show one form of a one-edged blade 328 suitable for use in the razor just described, and which has two openings 329, 329, adapted to receive the blade-retaining members 316, 316 and the recess 330 adapted to receive the blade-retaining member 320.

A consideration of Figures 27 and 28 will illustrate the means whereby the blade 328 can be removed, or a new blade introduced, only by the movement of the trips 326, 326.

One form of a device of my invention adapted to remove an old blade, or insert a new blade, or to perform blade operations at the same time, is illustrated in Figures 36 to 39.

This device is one which acts as a blade holder, a blade ejector and a blade remover, thus possessing all the necesary functions for removing an old blade, depositing a new blade and fastening the new blade into position for shaving.

This particular form of a device of my invention comprises the top member 331, extended into the two side flanges 332, 332, and the rear flange 333, the sides being bent downwardly 334, 334, thence inwardly 335, 335, inclined upwardly, 336, 336 and thence inwardly 337, 337, 337', 337'. The front portion 338 of the top 331 being inclined downwardly and spaced from the members 337', 337'. The top member 331 has the recess 338', and two upwardly extended lugs 339, 339.

The inclined portion 338 carries two resilient metalled flat arms, or projections 341, 341.

A flat spring 342 is riveted to the under face of the top 331 and is pressed by its resiliency against the under faces of the members 337', 337', the spring having openings 342', 342' through which the lugs 339, 339 carried by the top 331 extend. Each member 337 has an opening 340 for purposes described later. A plurality of stacked blades 328, 328 is placed between the spring 342 and the members 337', 337'.

The operation of the above-described blade magazine ejector with the described razor is shown in Figures 40 to 44.

In Figures 40 and 41, the resilient fingers 341, 341 of the ejector have been introduced beneath the old blade 328', and as the ejector is moved inwardly as shown in Figure 42, the old blade has moved upwardly over the fingers 341, 341, the trips 326, 326 have been moved rearwardly, thus moving the slidable member and releasing the blade retaining members carried thereby. At the same time, the new blade 328 is being positioned upon the guard.

In Figures 43 and 44, the ejector has been introduced to its full extent, the old blade 328' is positioned upon the top of the ejector with the ejector lugs 339, 339 extending through the openings 329, 329 of the blade and the new blade 328 is fully positioned upon the guard. If the ejector be now withdrawn, it will carry with it the old blade, and its full withdrawal will cause the springs 327, 327 to move the slidable member forwardly, thus moving the blade-retaining members into positions retaining the blade in position.

My invention, therefore, presents safety razors so constructed that the insertion and removal of blades by hand is practically impossible while the insertion and removal of blades is easily and effectively accomplished by devices adapted for that purpose and especially by blade magazines as shown and described.

Many changes may be made in the unessential elements of the devices, as shown, without going beyond the scope of my invention; the well-known spaced bar guards may be employed instead of toothed guards, the cap may be hinged to the guard, separable therefrom or otherwise attached thereto and other evident changes of parts may be employed.

Therefore, I do not limit myself to the particular form, size, number or arrangement of parts of the razors and devices as shown and described as these are given simply as means for clearly describing my invention and may be varied and changed without going beyond the scope of my invention.

What I claim is:

1. In a safety razor, adapted to removably attach a blade to the guard member in combination, a handle; a guard member adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

2. In a safety razor, adapted to removably attach a blade to the guard member in combination, a handle; a guard member adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member carried by said guard member and movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

3. In a safety razor, adapted to removably attach a blade to the guard member in combination, a handle; a guard member adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member, at least some of which are resiliently depressable below the upper face of said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

4. In a safety razor, adapted to removably attach a blade to the guard member in combination, a handle; a guard member adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member from blade-attaching position to non-blade-attaching position and means for returning said trip members to their original positions.

5. In a safety razor, adapted to removably attach a blade to the guard member in combination, a handle; a guard member adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member, at least some of which are resiliently depressable below the upper face of said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member from blade-attaching position to non-blade-attaching position and means for returning said trip members to their original positions.

6. In a safety razor, adapted to removably attach a blade to the guard member in combination, a handle; a guard member adapted to receive a blade thereon; a cap member carried by said handle; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

7. In a safety razor, adapted to removably attach a blade to the guard member in combination, a handle; a guard member adapted to receive a blade thereon; a cap member carried by said handle and capable of a 90° revolution with respect to said guard member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

8. In a safety razor, adapted to removably attach a blade to the guard member in combination, a handle; a guard member having a centrally positioned elongated opening and adapted to receive a blade thereon; a cap member having a dependent elongated lug adapted to pass through said guard opening when said guard and said cap are in parallel alignment but incapable of passing therethrough when said members are in non-alignment positions with respect to each other; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

9. In a safety razor, adapted to removably attach a blade to the guard member in combination, a handle; a guard member having a centrally positioned elongated opening and adapted to receive a blade thereon; a cap member having a dependent elongated lug adapted to pass through said guard opening when said guard and said cap are in parallel alignment but incapable of passing therethrough when said members are in non-alignment positions with respect to each other; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member, at least some of which are resiliently depressable below the upper face of said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member from blade-attaching position to non-blade-attaching position and means for returning said trip members to their original positions.

10. In a safety razor, adapted to removably attach a blade to the guard member in combination, a handle; a guard member, one end portion of which is downwardly extended, adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; a plurality of trip members co-operatingly attached to said slide member, the movement of said trip members moving said slidable member and means for returning said trip members to their original positions.

11. In a safety razor, adapted to removably attach a blade to the guard member in combination, a handle; a guard member adapted to receive a blade thereon; a cap member; means adapted to abut said cap upon a blade positioned upon said guard member; means adapted to remove said abutment between said cap and said blade; a plurality of upwardly extended lugs carried by said guard member and adapted to be passed through openings of a blade positioned upon said guard member; a slidable member movable across the under face of said guard member; a plurality of blade-attaching members carried by said slidable member and extending above the upper face of said guard member; means carried by said cap member adapted to allow of the extension of said blade-attaching members above the upper face of said guard member; a plurality of trip members co-operatingly attached to said slide member, the movement of said trip members moving said slidable member and means for returning said trip members to their original positions.

SIDNEY H. BENJAMIN.